(12) United States Patent
McCarville et al.

(10) Patent No.: US 9,586,379 B2
(45) Date of Patent: Mar. 7, 2017

(54) JOINING CURVED COMPOSITE SANDWICH PANELS

(71) Applicant: The Boeing Company, Chicago, IL (US)

(72) Inventors: Douglas A. McCarville, Orting, WA (US); Juan C. Guzman, Seattle, WA (US)

(73) Assignee: THE BOEING COMPANY, Chicago, IL (US)

( * ) Notice: Subject to any disclaimer, the term of this patent is extended or adjusted under 35 U.S.C. 154(b) by 101 days.

(21) Appl. No.: 14/338,309

(22) Filed: Jul. 22, 2014

(65) Prior Publication Data

US 2015/0079314 A1 Mar. 19, 2015

Related U.S. Application Data

(60) Division of application No. 12/398,138, filed on Mar. 4, 2009, now Pat. No. 8,815,038, which is a
(Continued)

(51) Int. Cl.
*B32B 3/20* (2006.01)
*B29C 70/08* (2006.01)
(Continued)

(52) U.S. Cl.
CPC ............ *B32B 3/20* (2013.01); *B29C 65/4835* (2013.01); *B29C 65/5057* (2013.01); *B29C 66/12443* (2013.01); *B29C 66/12449* (2013.01); *B29C 66/12463* (2013.01); *B29C 66/12469* (2013.01); *B29C 66/72523* (2013.01); *B29C 70/086* (2013.01); *B29D 99/0021* (2013.01); *B32B 1/02* (2013.01); *B32B 3/08* (2013.01); *B32B 3/28* (2013.01); *B32B 5/024* (2013.01);
(Continued)

(58) Field of Classification Search
CPC .......... B29C 65/5057; B29C 66/12443; B29C 66/12463; B29C 66/12469; B29D 99/0021; B29L 2024/003; B32B 3/20
See application file for complete search history.

(56) References Cited

U.S. PATENT DOCUMENTS 3,240,644 A 3/1966 Wolff
3,301,732 A 1/1967 Kunz
(Continued)

FOREIGN PATENT DOCUMENTS

EP 0282337 9/1988
EP 0373729 6/1990
(Continued)

OTHER PUBLICATIONS

U.S. Appl. No. 14/466,967, filed Aug. 23, 2014, McCarville et al.
(Continued)

*Primary Examiner* — Christopher Schatz
(74) *Attorney, Agent, or Firm* — Yee & Associates, P.C.

(57) ABSTRACT

A curved composite structure, comprises at least two curved composite panel segments joined together. Each of the panel segments includes a fluted core sandwiched between first and second facesheets. A layer of adhesive is used to rigidly bond the panel segments together.

20 Claims, 13 Drawing Sheets

Related U.S. Application Data continuation-in-part of application No. 12/243,926, filed on Oct. 1, 2008, now Pat. No. 7,998,299.

(60) Provisional application No. 61/196,242, filed on Oct. 16, 2008.

(51) Int. Cl.

| | | |
|---|---|---|
| *B29D 99/00* | (2010.01) | |
| *B32B 1/02* | (2006.01) | |
| *B32B 5/18* | (2006.01) | |
| *B32B 3/28* | (2006.01) | |
| *B32B 5/02* | (2006.01) | |
| *B32B 5/22* | (2006.01) | |
| *B32B 5/24* | (2006.01) | |
| *B32B 5/26* | (2006.01) | |
| *B32B 7/12* | (2006.01) | |
| *B32B 27/08* | (2006.01) | |
| *B32B 27/12* | (2006.01) | |
| *B32B 3/08* | (2006.01) | |
| *B29C 65/48* | (2006.01) | |
| *B29C 65/50* | (2006.01) | |
| *B29C 65/00* | (2006.01) | |
| *B29L 24/00* | (2006.01) | |
| *B29L 31/30* | (2006.01) | |
| *B29L 31/00* | (2006.01) | |

(52) U.S. Cl.
CPC .............. *B32B 5/026* (2013.01); *B32B 5/18* (2013.01); *B32B 5/22* (2013.01); *B32B 5/245* (2013.01); *B32B 5/26* (2013.01); *B32B 7/12* (2013.01); *B32B 27/08* (2013.01); *B32B 27/12* (2013.01); *B29C 66/721* (2013.01); *B29L 2024/003* (2013.01); *B29L 2031/3076* (2013.01); *B29L 2031/7172* (2013.01); *B32B 2250/03* (2013.01); *B32B 2260/021* (2013.01); *B32B 2260/046* (2013.01); *B32B 2262/106* (2013.01); *B32B 2266/0214* (2013.01); *B32B 2305/34* (2013.01); *B32B 2307/102* (2013.01); *B32B 2307/304* (2013.01); *B32B 2307/306* (2013.01); *B32B 2307/50* (2013.01); *B32B 2307/546* (2013.01); *B32B 2307/558* (2013.01); *B32B 2307/718* (2013.01); *B32B 2307/72* (2013.01); *B32B 2439/00* (2013.01); *B32B 2605/18* (2013.01); *Y10T 156/10* (2015.01); *Y10T 156/1038* (2015.01); *Y10T 156/1066* (2015.01); *Y10T 428/13* (2015.01); *Y10T 428/192* (2015.01); *Y10T 428/24496* (2015.01); *Y10T 428/24612* (2015.01); *Y10T 428/24628* (2015.01)

(56) References Cited

U.S. PATENT DOCUMENTS

| | | |
|---|---|---|
| 3,319,274 A | 5/1967 | Upton |
| 3,339,326 A | 9/1967 | Derr et al. |
| 3,432,859 A | 3/1969 | Jordan et al. |
| 3,544,417 A | 12/1970 | Corzine |
| 3,573,144 A | 3/1971 | Andersen |
| 3,658,612 A | 4/1972 | Corzine |
| 3,732,138 A | 5/1973 | Almog |
| 3,779,487 A | 12/1973 | Ashton et al. |
| 3,795,559 A | 3/1974 | Horn et al. |
| 3,885,071 A | 5/1975 | Blad et al. |
| 3,943,980 A | 3/1976 | Rheaume |
| 3,965,942 A | 6/1976 | Hatch |
| 4,051,289 A | 9/1977 | Adamson |
| 4,055,268 A | 10/1977 | Barthel |
| 4,132,577 A | 1/1979 | Wintermantel |
| 4,154,363 A | 5/1979 | Barthel |
| 4,156,054 A | 5/1979 | Gurewitsch |
| 4,177,306 A | 12/1979 | Schulz et al. |
| 4,223,053 A | 9/1980 | Brogan |
| 4,366,917 A | 1/1983 | Kotcharian |
| 4,461,398 A | 7/1984 | Argy |
| 4,617,072 A | 10/1986 | Merz |
| 4,726,707 A | 2/1988 | Newton |
| 4,835,975 A | 6/1989 | Windecker |
| 5,025,943 A | 6/1991 | Forsman |
| 5,061,542 A | 10/1991 | Brace |
| 5,118,555 A | 6/1992 | Horovitz |
| 5,150,812 A | 9/1992 | Adams |
| 5,419,139 A | 5/1995 | Blum et al. |
| 5,469,686 A | 11/1995 | Pykiet |
| 5,538,589 A | 7/1996 | Jensen et al. |
| 5,700,545 A | 12/1997 | Audi et al. |
| 5,879,498 A | 3/1999 | Lemons |
| 5,904,972 A | 5/1999 | Tunis, III et al. |
| 6,178,754 B1 | 1/2001 | Dujarric |
| 6,207,256 B1 | 3/2001 | Tashiro |
| 6,375,125 B1 | 4/2002 | Kirn et al. |
| 6,592,704 B1 | 7/2003 | Benzing, II |
| 6,743,504 B1 | 6/2004 | Allen et al. |
| 7,296,769 B2 | 11/2007 | Hogenson et al. |
| 7,998,299 B2 | 8/2011 | McCarville et al. |
| 8,815,038 B2 | 8/2014 | McCarville et al. |
| 8,834,667 B2 | 9/2014 | McCarville et al. |
| 2004/0197519 A1* | 10/2004 | Elzey .................. B32B 3/28 428/68 |
| 2010/0043955 A1 | 2/2010 | Hornick et al. |
| 2010/0065688 A1 | 3/2010 | Wood |
| 2010/0116938 A1 | 5/2010 | Kline et al. |
| 2011/0300343 A1 | 12/2011 | McCarville et al. |
| 2014/0363595 A1 | 12/2014 | McCarville et al. |

FOREIGN PATENT DOCUMENTS

| | | |
|---|---|---|
| EP | 0628406 | 12/1994 |
| EP | 2444238 | 4/2012 |
| FR | 2872085 | 12/2005 |
| WO | WO9222053 | 12/1992 |
| WO | WO2010040004 | 4/2010 |

OTHER PUBLICATIONS

International Search Report, dated Jan. 14, 2010, regarding Application No. PCT/US2009/059290 (WO2010040004), 5 pages.

Black, "Fiber Placement the Centerpiece of NCAM," Composites World, Jan. 1, 2004, 4 pages. Retreived Jun. 27, 2012 from http://www.compositesworld.com/articles/fiber-placement-the-centerpiece-of-ncam.

Black, "An Update on Composite Tanks for Cryogens," Composites World, Nov. 1, 2005, 5 pages. Retrieved Jun. 27, 2012 from http://www.compositesworld.com/articles/an-update-on-composite-tanks-for-cryogens.

Office Action, dated Dec. 9, 2010, regarding U.S. Appl. No. 12/243,926, 11 pages.

Notice of Allowance, dated Apr. 19, 2011, regarding U.S. Appl. No. 12/243,926, 8 pages.

Office Action, dated Mar. 30, 2011, regarding U.S. Appl. No. 12/398,138, 14 pages.

Final Office Action, dated Oct. 14, 2011, regarding U.S. Appl. No. 12/398,138, 14 pages.

Notice of Allowance, dated Mar. 28, 2014, regarding U.S. Appl. No. 12/398,138, 30 pages.

Office Action, dated Nov. 14, 2011, regarding U.S. Appl. No. 13/211,166, 7 pages.

Final Office Action, dated Jul. 18, 2012, regarding U.S. Appl. No. 13/211,166, 22 pages.

Office Action, dated Apr. 13, 2012, regarding U.S. Appl. No. 12/907,329, 17 pages.

Final Office Action, dated Oct. 29, 2012, regarding U.S. Appl. No. 12/907,329, 23 pages.

(56) References Cited

OTHER PUBLICATIONS

Office Action, dated Oct. 7, 2013, regarding U.S. Appl. No. 12/907,329, 20 pages.
Final Office Action, dated Feb. 11, 2014, regarding U.S. Appl. No. 12/907,329, 20 pages.
Notice of Allowance, dated May 12, 2014, regarding U.S. Appl. No. 12/907,329, 7 pages.

* cited by examiner

JOINING CURVED COMPOSITE SANDWICH PANELS

CROSS REFERENCE TO RELATED APPLICATIONS

This application is a divisional application of copending U.S. patent application Ser. No. 12/398,138 filed Mar. 4, 2009, which is a continuation-in-part of copending U.S. patent application Ser. No. 12/243,926 filed Oct. 1, 2008, and claims the benefit of Provisional U.S. Patent Application No. 61/196,242 filed Oct. 16, 2008, the entire disclosures of which are incorporated by reference herein.

TECHNICAL FIELD

This disclosure generally relates to composite structures, and deals more particularly with a method of fabricating a curved composite structure by bonding composite sandwich panel segments together, as well as to a curved composite structure fabricated thereby.

BACKGROUND

Large composite structures are sometimes fabricated by joining together composite sandwich panels. For example, in the aerospace industry, curved composite sandwich panels may be joined together to form barrel sections used for space exploration vehicles, fuel tanks and airplane fuselages, to name a few. The panel segments may be assembled on a cylindrical cure mandrel and then processed in an autoclave to co-cure the panel segments and form an integrated structure with strong joints between the panel segments.

Autoclave curing of the composite structures mentioned above possesses several disadvantages. For example, relatively large composite structures, such as barrel-shaped fuselage sections, may require the use of large size autoclaves which are relatively expensive and may displace large amounts of factory floor space. Such autoclaves may represent a substantial capital investment where multiple sets of equipment are required to support higher production requirements. Furthermore, commercially available autoclaves may not be large enough to accommodate large composite structures approaching ten meters in diameter or more.

Accordingly, there is a need for a method of joining sandwich panels into relatively large composite structures which obviates the need for co-curing the panels in an autoclave. There is also a need for a method of fabricating relatively large scale composite structures using multiple panel segments that are bonded together.

SUMMARY

The disclosed embodiments provide a method of fabricating relatively large scale composite structures using composite panel segments that are joined together by bonded joints. By bonding the panel segment joints, the need for co-curing the structure within an autoclave may be eliminated, consequently composite structures having dimensions exceeding the size of commercially available autoclaves may be possible. The method may be particularly useful in high production environments where parallel assembly of multiple composite structures is needed.

According to one disclosed embodiment, a curved composite structure is provided having at least two curved composite panel segments. The composite panel segments each have a fluted core sandwiched between first and second facesheets. An adhesive is used to bond the panel segments together. The composite structure includes first and second overlapping joints between the facesheets of the joining panels which are bonded together by the adhesive.

According to a method embodiment, a curved composite structure is fabricated. At least two composite panel segments are laid up and cured. Overlapping joints between the cured panel segments are formed, and the panel segments are bonded together at the overlapping joints. Forming the overlapping joint between the panel segments may include scarfing edges of facesheets on each of the panel segments. Bonding the panel segments together may include placing a layer of adhesive on the scarfed edges and overlapping the scarfed edges.

According to another method embodiment, a barrel shaped composite structure is fabricated. A plurality of curved composite panel segments are formed and then cured. Joints are formed between the panel segments and the panel segments are bonded together at the joints.

The disclosed embodiments satisfy the need for a method of forming relatively large composite structures using curved composite sandwich panels that are bonded together, thereby obviating the need for autoclaved co-curing.

Other features, benefits and advantages of the disclosed embodiments will become apparent from the following description of embodiments, when viewed in accordance with the attached drawings and appended claims

BRIEF DESCRIPTION OF THE ILLUSTRATIONS

DETAILED DESCRIPTION

Figure 1:
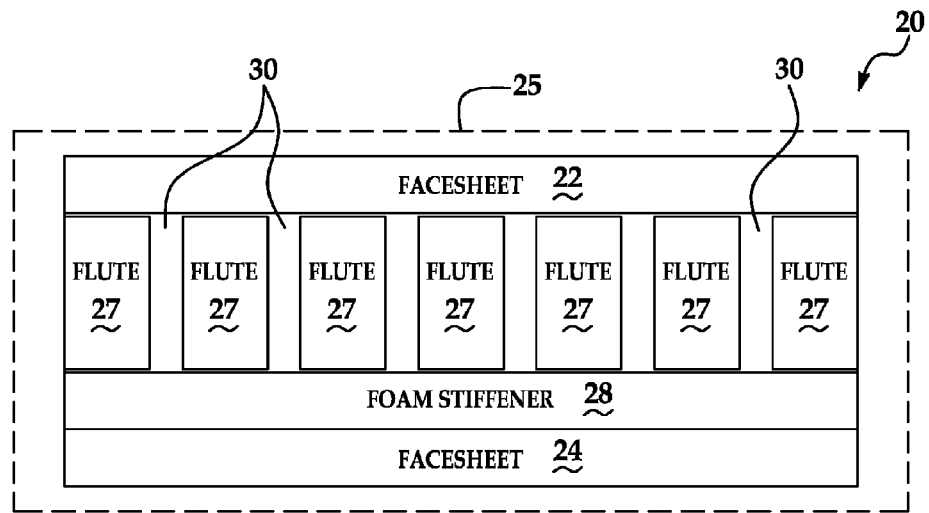
FIG. 1 is a functional block diagram of composite truss panel having a fluted core.
Figure 3:
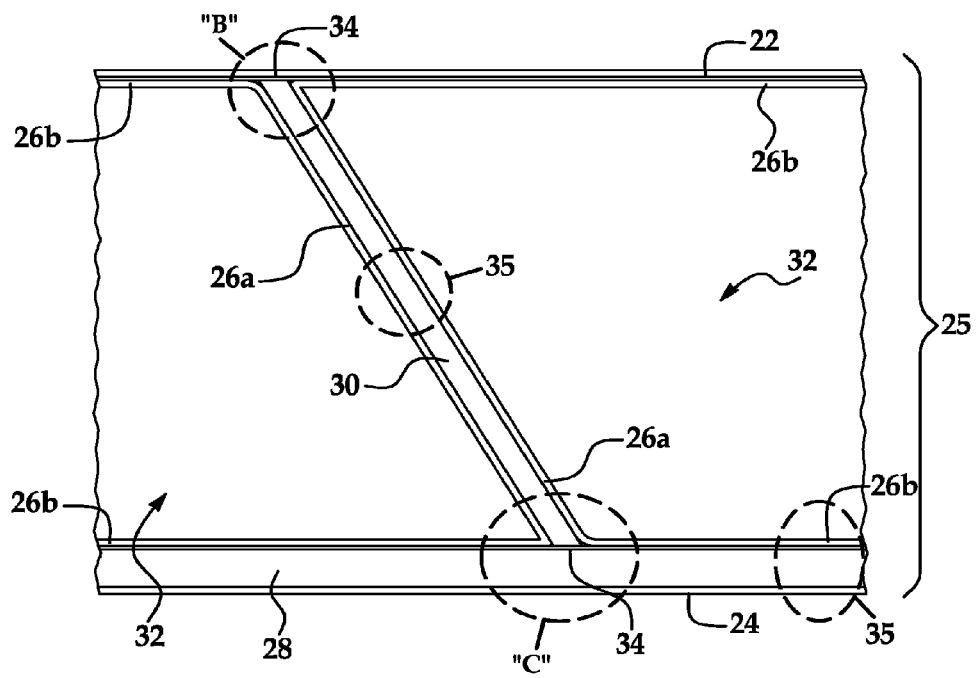
FIG. 3 is an enlarged view of the area designated as "A" in FIG. 2.

Referring first to FIGS. 1, and 3, the disclosed embodiments generally relate to a composite truss panel 20 which may be used to form a variety of structures such as without limitation, a cryogenic fuel tank (not shown) for aerospace vehicles.

The truss panel 20 broadly comprises a first sandwich 25 that includes a fluted core 26 sandwiched between first and second, generally parallel facesheets 22, 24, and a second sandwich 35. As will be discussed later, in some embodiments, the facesheets 22, 24 may not be parallel to each other. Each of the facesheets 22, 24 may comprise one or more plies of a fiber reinforced resin, such as carbon fiber epoxy. In a cryogenic fuel tank application, facesheet 22 may comprise an inside wall of the tank, while the facesheet 24 forms the outer wall. As will be discussed below in more detail, each of the flutes 27 may also be formed from a fiber reinforced resin material which may comprise one or more plies of a woven or knitted fabric that is cured to form a lightweight high strength core structure.

The fluted core 26 comprises a series of hollow, isosceles trapezoidal flutes 27 alternately arranged between facesheets 22, 24. As best seen in FIG. 1a, each of the flutes 27 includes inclined side walls 26a that extend traverse to the planes of facesheets 22, 24, and top and bottom walls 26b which extend substantially parallel and are adjacent to the facesheets 22, 24. The truss-like walls 26a, 26b provide improved structural properties in terms of tensile, compression, shear and bending strengths. By virtue of their hollow construction, each of the flutes includes an interior passageway 32 that extends the length of the flute 27 and thus may allow fluids or gases to flow therethrough. It should be noted here that although the flutes 27 have been illustrated as having an isosceles trapezoidal cross sectional shape, a variety of other geometric shapes are possible, including those in which the walls 26a extend substantially normal to the facesheets 22, 24.

The panel 20 includes one or more lightweight structural foam stiffeners indicated by the numerals 28 and which are sandwiched between other components of the truss panel 20 to form at least one second sandwich 35. Each of the stiffeners 28, 30 may comprise a lightweight, low density structural foam that may have a density between approximately 2 and 6 pounds per cubic foot. In space launch and exploration vehicle applications, such as fuel tanks, the foam may be a high temperature foam suitable for temperatures up to approximately 300 degrees F. or more, while in terrestrial applications, the foam may be suitable for temperatures up to approximately 180 degrees F. Examples of suitable foams include, without limitation, polymethacrylimide (PMI) and polyisocyanurate.

Figure 2:
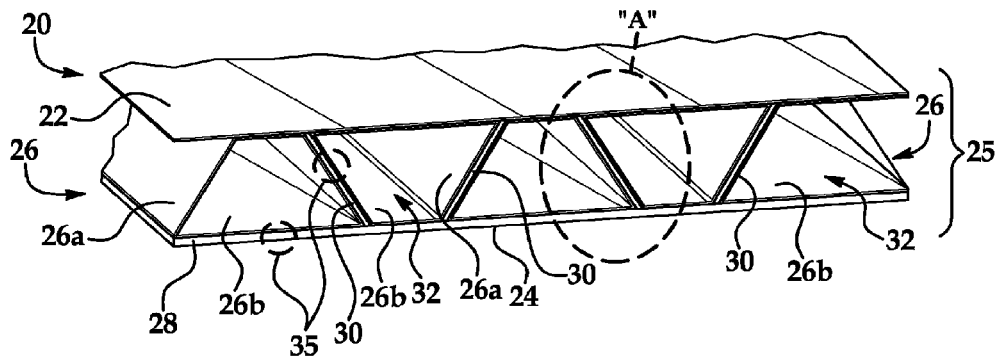
FIG. 2 is an isometric illustration of one embodiment of the composite truss panel having a fluted core.
Figure 2A:
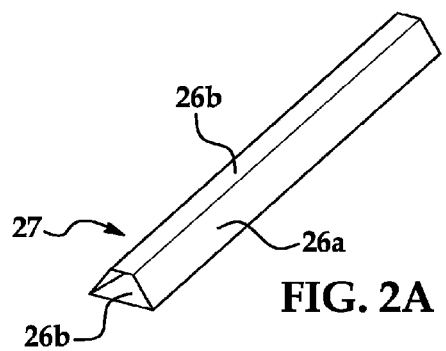
FIG. 2A is an isometric illustration of a flute forming part of the fluted core shown in FIG. 1.

In the embodiment illustrated in FIGS. 1-3, the stiffeners 30 are sandwiched between adjacent walls 26a of the flutes 27 to form a second sandwich 35 within the first sandwich 25, thus forming a sandwich-in-sandwich construction. It should be noted here that while the adjacent walls 26a of the flutes 27 are shown as being flat in the illustrated embodiment with a substantially constant thickness, such walls 26a and/or the stiffeners 30 may have other shapes. For example, the walls 26a, and/or the stiffeners 30 may be tapered or have one or more joggles (not shown) therein. Moreover, in some embodiments, the adjacent walls 26a may not be parallel to each other, but instead may diverge from, or converge toward each other, in which case the stiffeners 30 sandwiched between the walls 26a may be tapered to substantially match the shape of the space between the walls 26a of adjacent flutes 27.

Placement of the foam stiffeners between the flute walls 26a may increase the overall panel bending stiffness while increasing weight only minimally. The foam stiffeners within the flute walls 26a can also be used to tailor/control heat flow between the facesheets 22, 24. The stiffener 28 is sandwiched between the facesheet 24 and the bottom of the fluted core 26 that is formed by the bottom walls 26b of the flutes 27, thereby also forming a second sandwich 35. As shown in FIG. 2, in those applications where the facesheets 22, 24 may be pre-cured, adhesive film 34 may be used to assist in bonding facesheet 22 to the core 26, and in bonding the facesheet 24 to the stiffener 28.

The use of the foam stiffeners 28, 30 sandwiched at various locations between the facesheets 22, 24, to form a second sandwich 35 within the first sandwich 25 may provide both thermal and acoustic isolation benefits, while potentially increasing impact damage tolerance, and therefore may have both a structural and insulating function. As a result, in cryogenic fuel tank applications, it may be possible to reduce the amount of parasitic thermal protective nonstructural foam that may otherwise be needed on the exterior of the tank walls.

Figure 4A:
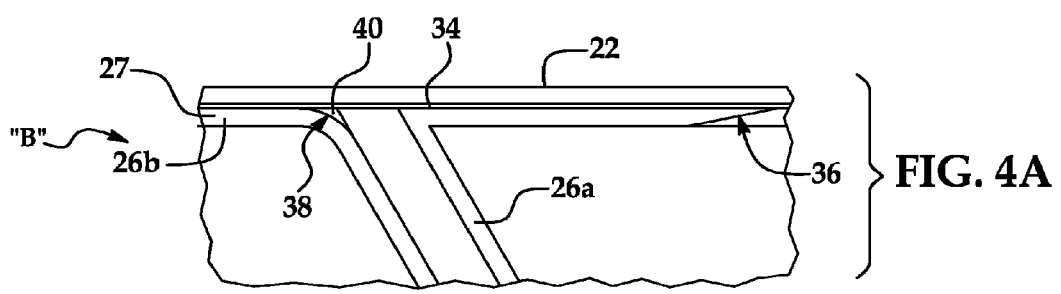
FIGS. 4A and 4B are enlarged views of the areas designated as "B" and "C" respectively in FIG. 3.
Figure 4B:
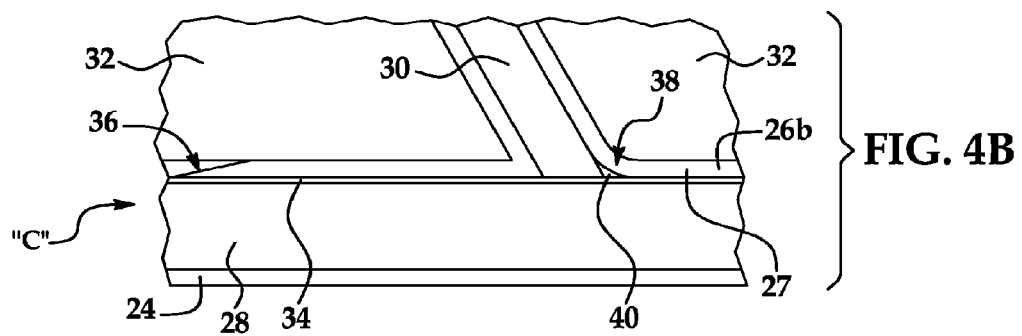

Referring now to FIGS. 4a and 4b, each of the flutes 27 may have a radius 38 at the junction of the side walls 26a and top walls 26b. The radius 38 may form a gap (not shown) that may be filled with a radius filler 40 in order to assure that a void is not present between the truss core 26 and the facesheet 22. Depending upon the method used to form the individual flutes 27, a diagonal splice 36 may be provided which represents a scarf joint formed by the overlapping plies forming the individual flutes 27.

Figure 5:
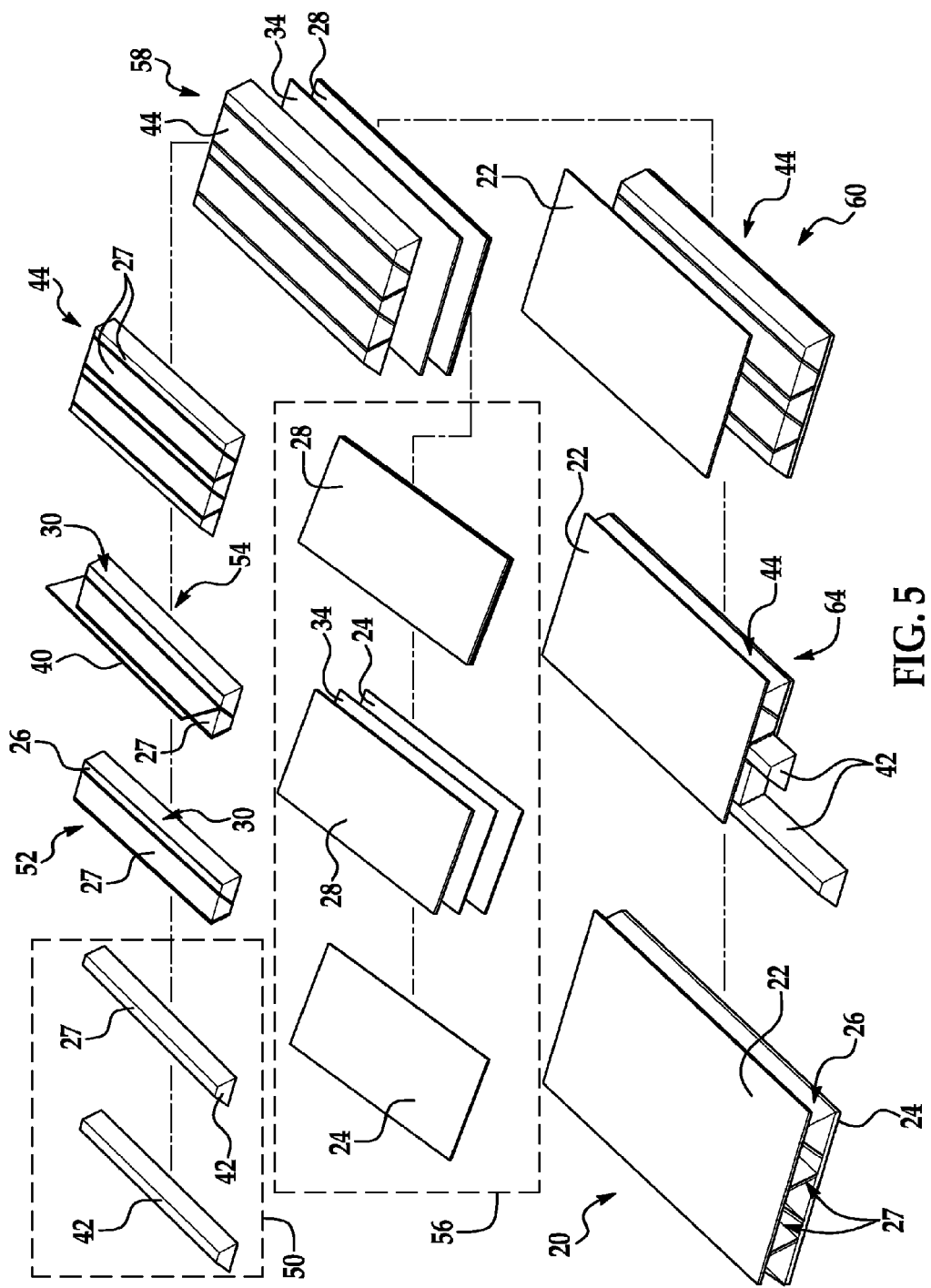
FIG. 5 is a perspective illustration showing components of the composite truss panel in progressive stages of assembly.
Figure 7:
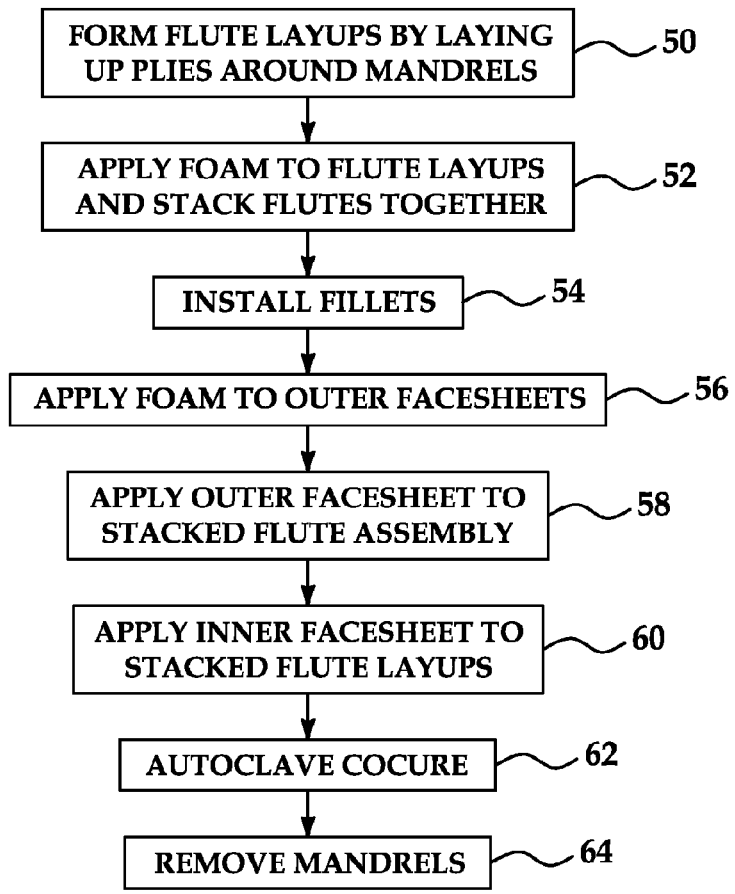
FIG. 7 is a flow diagram illustrating a method for making the composite truss panel.

Attention is now directed to FIGS. 5 and 7 which illustrate a method for making the composite truss panel shown in FIG. 2. At 50, a mandrel 42 is provided that has a cross sectional shape substantially matching that of the interior of the individual flutes 27. The mandrels 42 may comprise, for example and without limitation, inflatable tooling such as a silicone rubber bladder or hard tooling formed of rubber, aluminum or polytetrafluoroethylene (TEFLON®). The mandrel 42 preferably has a relatively high coefficient of thermal expansion (CTE). The mandrels 42 provide support during layup of the individual flutes 27. One or more plies (not shown) of fiber reinforced prepreg, which may comprise knitted or woven cloth sheets of carbon fiber epoxy are then laid up over each of the mandrels 42 by knitting, wrapping, or drape forming. The high CTE of the mandrels 42 results in the mandrels expanding slightly during a subsequent cure process in an autoclave which assists in applying compaction pressure to the flute layups. Mandrel expansion also helps facilitate the removal of layup initiated trapped air and volatiles that may arise during the cure cycle.

Next, at 52, the foam stiffeners 30 are placed on the sidewalls 26 of the flutes 27, and the flutes 27 are then stacked together in side-by-side relationship, sandwiching the stiffeners 30 between adjacent ones of the flutes 27. In the case of the exemplary isosceles trapezoidal shaped flutes 27, the individual flutes 27 are alternately inverted as they are stacked in order to arrange their side walls 27a in face-to-face relationship. Sandwiching of the foam stiffeners 30 between adjacent walls 26a of the flutes 27 assists in increasing the buckling strength of the flute walls 26a, while potentially increasing impact damage tolerance, and may thus reduce the amount of wrap plies required to form the flutes 27.

Figure 6:
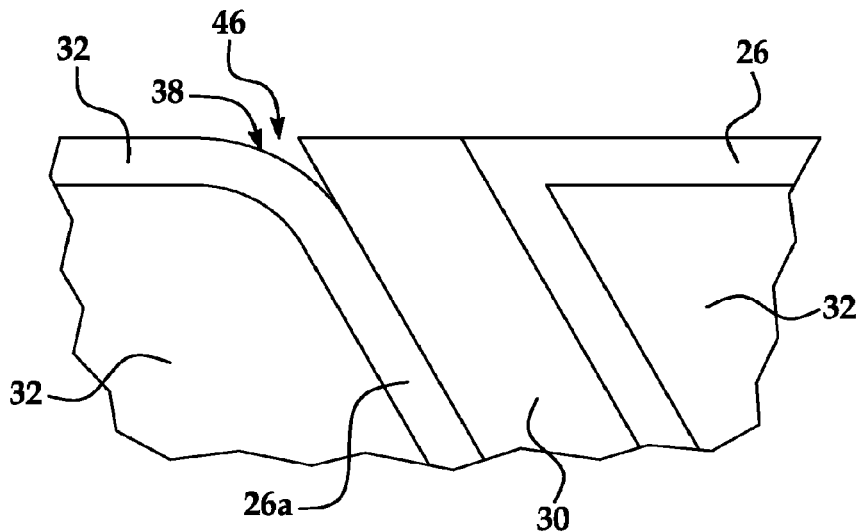
FIG. 6 is an end view showing a gap between a radius on a flute and a foam stiffener.

At this point, as shown in FIG. 6, gaps 46 may be present between the end of each stiffener 30 and the radius 38 of each of the flutes 27. In order to fill the gaps 46, a radius filler 40 (also known as a fillet or noodle) is placed into the gaps 46 as shown at step 54. The radius fillers 40 may be formed of a polymer adhesive or prepreg tape and extend down the entire length of the individual flutes 27. The radius fillers aid in the subsequent wrapping process which may prevent stress concentrations within the structure. When the gaps 46 have been filled with the fillers 40, a core assembly 44 is complete.

Next, as shown at 56, facesheet 24 may be laid up either by hand or using a fiber replacement machine (not shown). A foam stiffener 28 in the form of a foam sheet may then be applied to the facesheet 24, using an adhesive film 34. Where the facesheet 24 forms an outer skin requiring higher temperature capability, the facesheet 24 may be pre-cured. The assembly of the stiffener 28 and facesheet 24 may be either co-bonded or secondarily bonded to the core subassembly 44 using a film adhesive 34, as shown at step 58.

Next, as shown at 60, facesheet 22 may be joined to the other face of the core subassembly 44 using either bonding techniques or by co-curing. Then, at 62, the assembled panel 20 is placed in an autoclave (not shown) which cures the assembly using high temperature/pressure with suitable cycles that maximize removal of volatiles and reduce the porosity of the laminate walls. After autoclave curing at 62, the mandrels 42 may be removed, as shown at step 64. The final panel 20 may then be trimmed and inspected as may be required.

Figure 8:
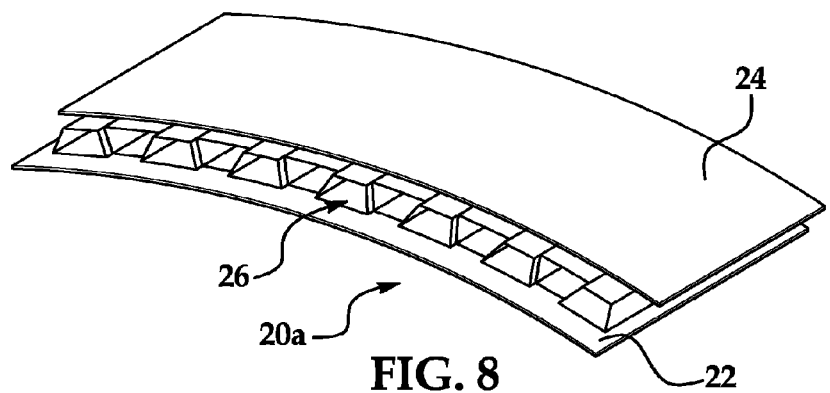
FIG. 8 is a perspective view illustrating an alternate embodiment of the composite truss panel.
Figure 9:
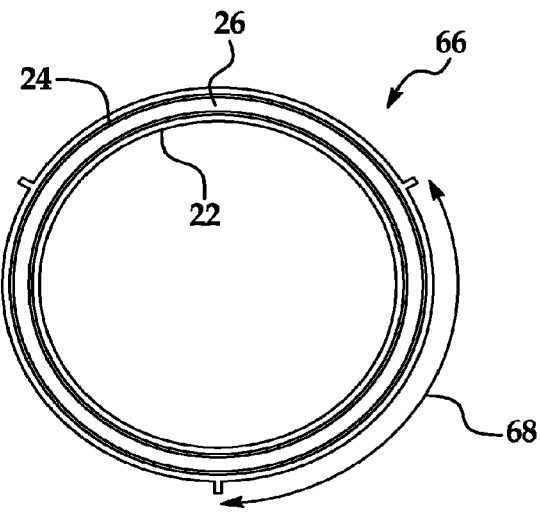
FIG. 9 is a sectional view of a container formed from composite truss panels of the type shown in FIG. 7.

Referring now to FIGS. 8 and 9, in some applications a curved composite truss panel 20a may be required in order to form, for example, a cylindrical fuel tank 66 shown in FIG. 8. The curved truss panel 20a may comprise segments 68 that are joined together to form the walls of the tank 66. In this application, the mandrels shown in FIG. 5 may include suitable curvatures (not shown) that result in a core 26 having a curvature that matches the curvature of the tank 66. Appropriate tooling (not shown) may be required for laying up and assembling the facesheets 22, 24 and fluted core 26.

Figure 10:
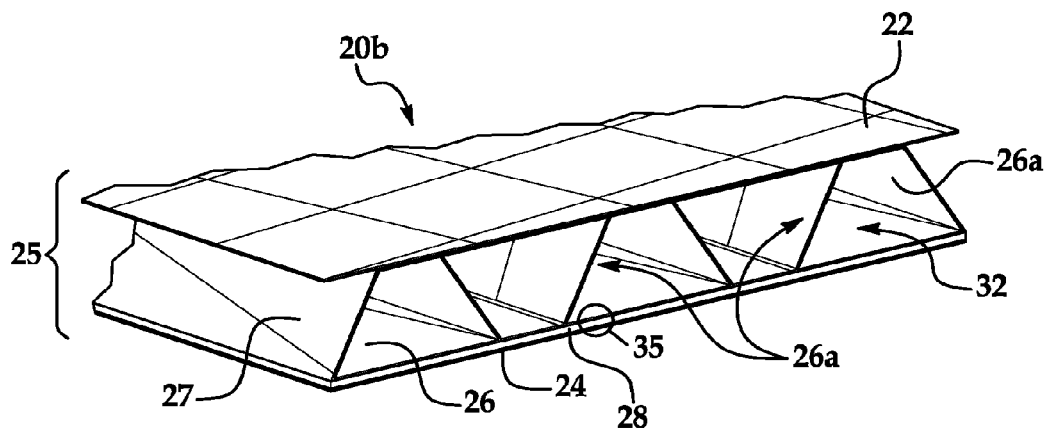
FIG. 10 is an isometric view of an alternate embodiment of the composite truss panel.

The high temperature, low density stiffeners 28, 30 previously discussed may be sandwiched between the facesheets 22, 24 at various locations to form the second sandwich 35 shown in FIGS. 1-3. For example, as shown in FIG. 10, a stiffener 28 may be advantageously sandwiched between the core 26 and the facesheet 24 which forms the outer wall of the panel 20b. In this example, foam stiffeners are not sandwiched between the walls 26a of the individual flutes 27.

Figure 11:
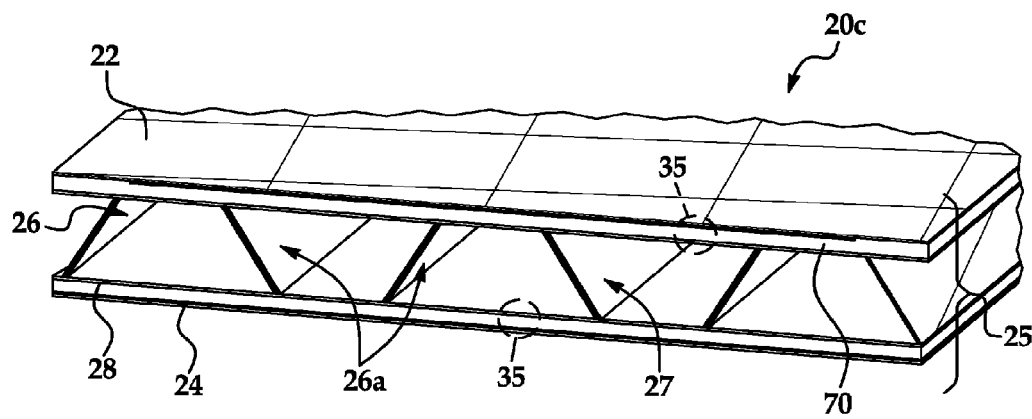
FIG. 11 is an isometric illustration of another embodiment of the composite truss panel.

FIG. 11 illustrates another embodiment of the truss panel 20c in which low density foam stiffeners 24, 70 are sandwiched respectively between the core 26 and the facesheets 22, 24. The presence of the foam stiffeners 24, between the core 26 and the facesheets 22, 24 may increase the bending stiffness of the truss panel 20c. In this example, similar to the truss panel 20b shown in FIG. 10, foam stiffeners are not present between the walls 26a of the individual flutes 27.

Figure 12:
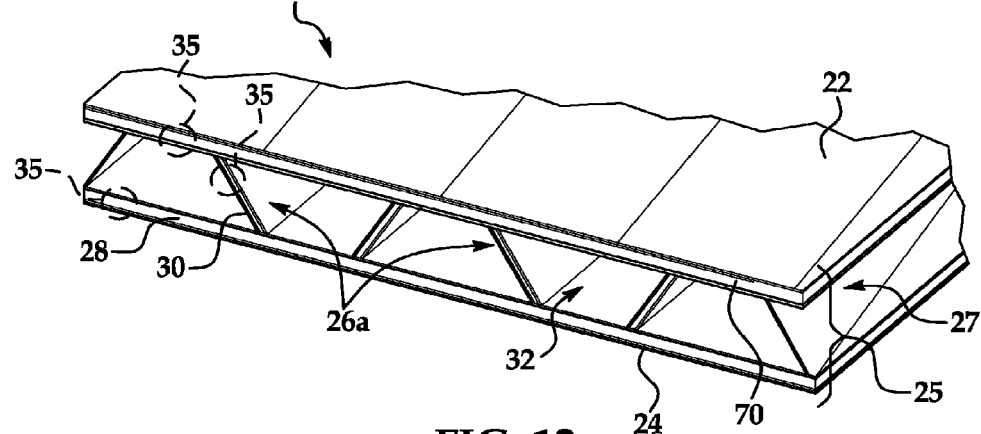
FIG. 12 is an isometric illustration of a further embodiment of the composite truss panel.

FIG. 12 illustrates a further embodiment of the truss panel 20d which is similar to panel 20c shown in FIG. 11, except that foam stiffeners 30 are also sandwiched between adjacent walls 26a of the flutes 27.

Figure 13:
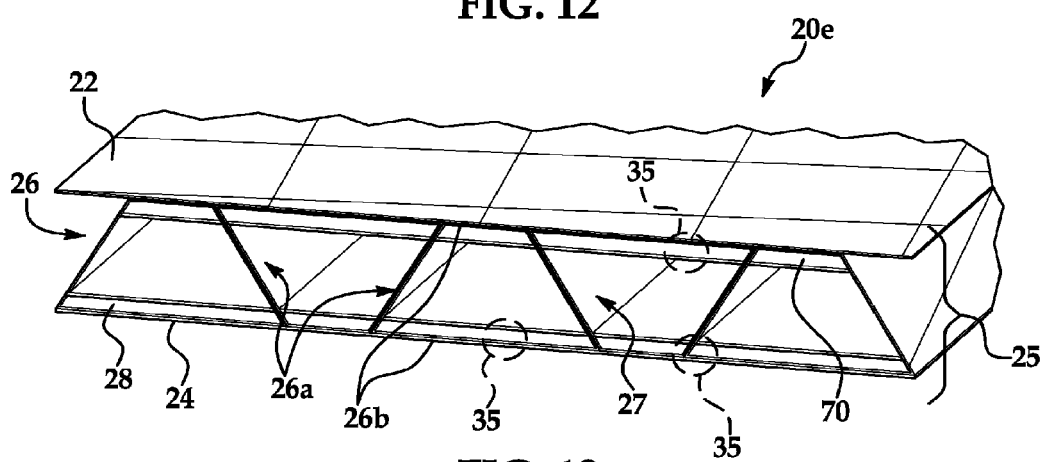
FIG. 13 is an isometric illustration of another embodiment of the composite truss panel.

FIG. 13 illustrates another embodiment of the truss panel 20e in which the top and bottom walls 26b of the flutes 27 are in face-to-face contact with one of the facesheets 22, 24, and foam stiffeners 28, 70 are disposed inside each of the flutes 27, such that each of the walls 26b is sandwiched between a stiffener 28, 70 and one of the facesheets 22, 24. Similarly, each of the sidewalls 26a is sandwiched between adjacent ones of the stiffeners 28, 70.

Figure 14:
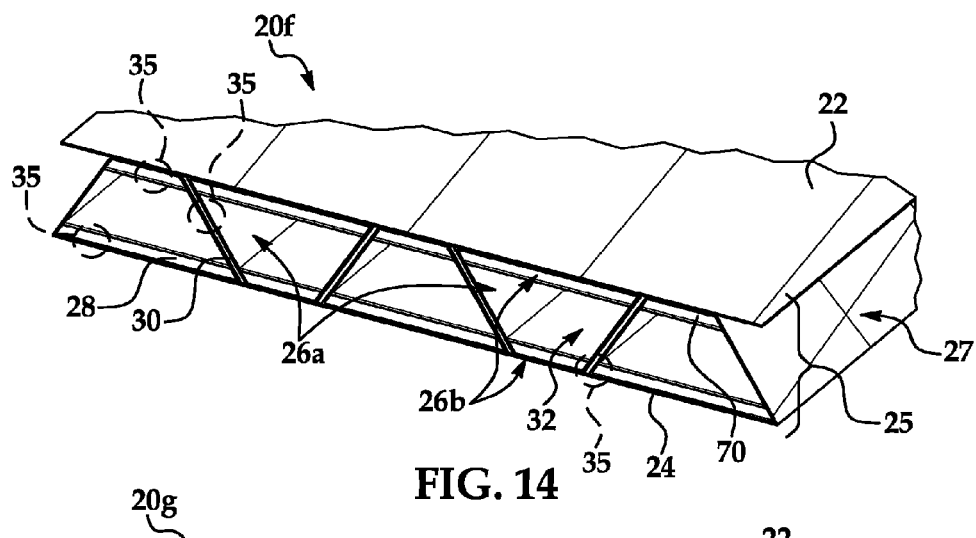
FIG. 14 is an isometric illustration of a further embodiment of the composite truss panel.

FIG. 14 illustrates still another embodiment of the truss panel 20f which is similar to the embodiment 20e shown in FIG. 13, except that foam stiffeners 30 are also present between the adjacent walls 26a of the flutes 27. The embodiments 20e and 20f shown in FIGS. 13 and 14 may stiffen the core 26 and improve the pull-off strength of the panel 20.

Figure 15:
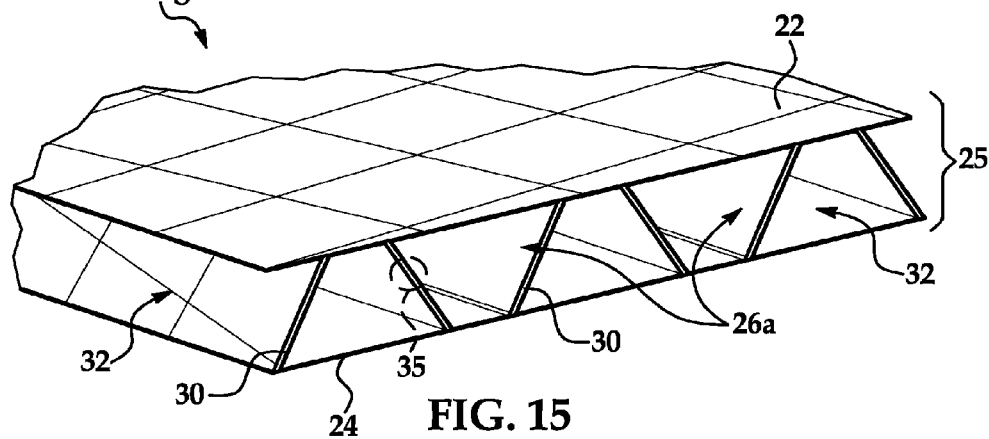
FIG. 15 is an isometric illustration of another embodiment of the composite truss panel.

Finally, as shown in FIG. 15, in yet another embodiment of the truss panel 20g, foam stiffeners 30 are sandwiched only between the adjacent walls 26a of the individual flutes 27.

Figure 16:
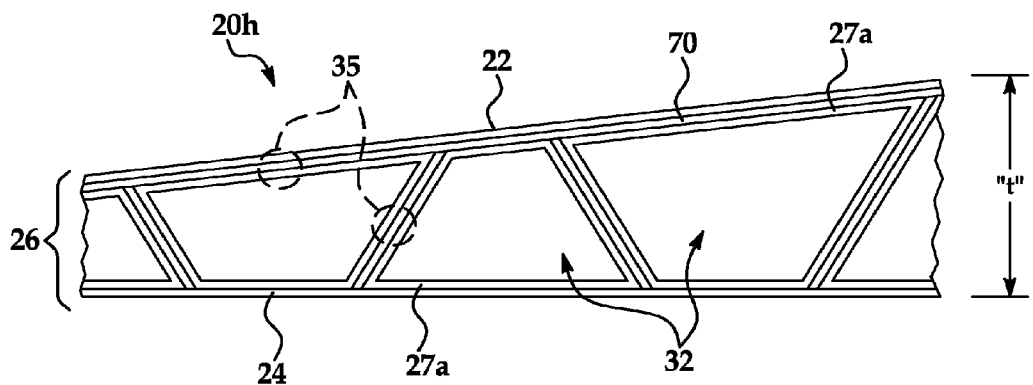
FIG. 16 is a cross sectional illustration of a further embodiment of the composite truss panel.

In some embodiments, the facesheets 22, 24 may not be parallel to each other. For example, as illustrated in FIG. 16, the facesheets 22, 24 may diverge away (or toward) each other, forming a truss panel 20h that has a varying thickness "t". In this embodiment, the flutes 27a may have a similar overall shape, but differing dimensions so that the fluted core 26 is tapered to substantially match the varying thickness "t" of the panel 20f. Although not shown in the drawings, the truss panel 20 may have one or more joggles therein.

The various embodiments of the truss panel 20 described above provide inner and outer laminates in the flute walls 26a that may carry most of the bending loads (tension and compression), while the foam stiffeners 28, 30, may carry most of the compression and shear loads. Depending on the embodiment of the truss panel 20, the fluted core 26 may carry most of the compression and shear loads of the entire panel, and the foam stiffeners 28, 30, 70 may carry most of the bending loads of the entire panel.

The use of the a foam stiffener 28 on inner wall of the facesheet 24 in the embodiments shown in FIGS. 2, 10, 11, 12, 13 and 14, may improve impact damage tolerance and may assist in providing overall system insulation and thereby help control purge gas temperatures. The impact damage tolerance performance and the level of system insulation may vary with the density of the foam stiffeners 28. Placing the foam stiffener 70 on the inner wall of the facesheet 22 in the embodiments shown in FIGS. 11-14, may provide overall system insulation and may reduce the need for parasitic tank thermal protection in cryogenic fuel tank applications. Additionally, placing the foam stiffener on the inner wall of the facesheet 22 may allow the use of higher temperature capable resin systems. For example Bismaleimides (BMI) may be used on the outer surfaces of a cryogenic fuel tank while maintaining the ability to use lower cost/more durable resin systems in most other areas of the tank.

Figure 17:
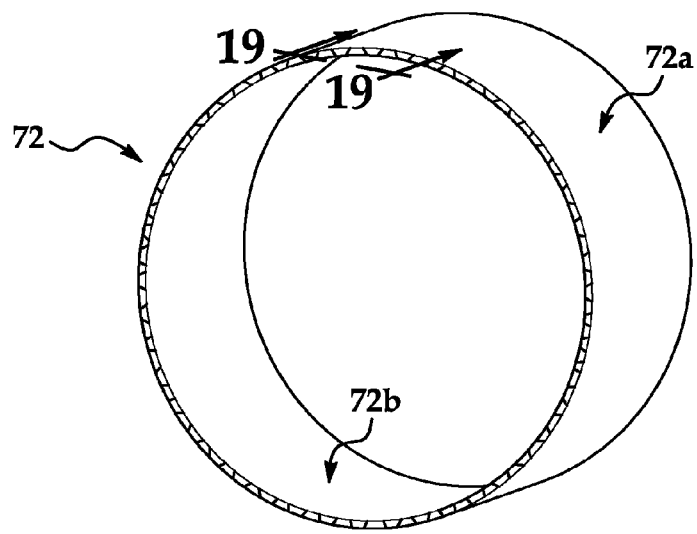
FIG. 17 is a perspective illustration of a barrel shaped composite structure fabricated according to the disclosed method.
Figure 18:
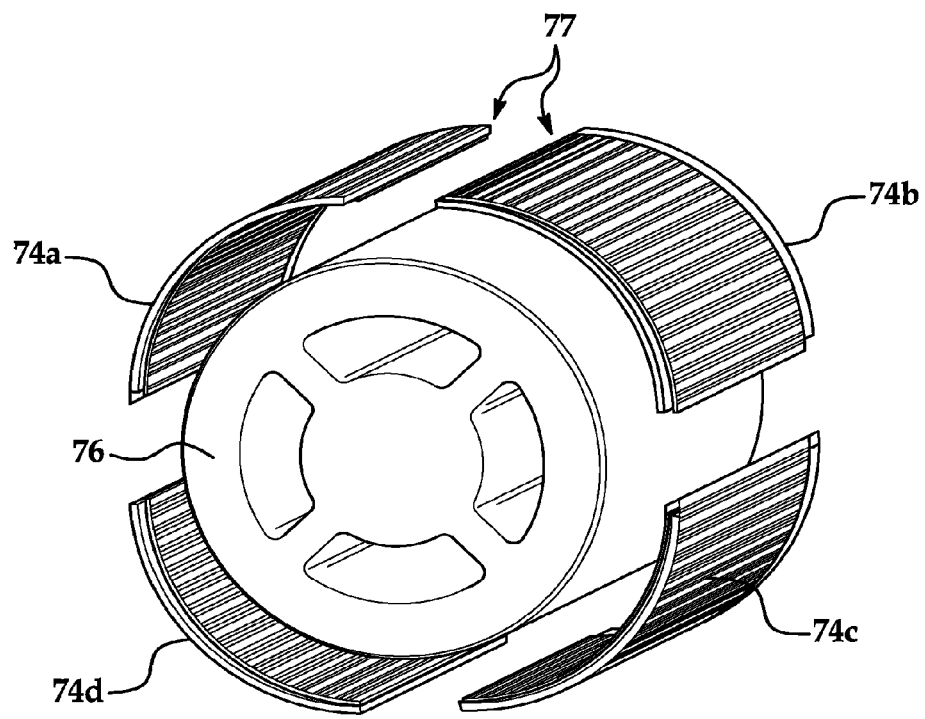
FIG. 18 is an exploded, perspective illustration of a layup mandrel used in joining curved composite panels of the composite structure shown in FIG. 17.

Referring to FIGS. 17 and 18, a curved composite structure 72 may be fabricated by a method that includes bonding together a plurality of curved composite sandwich panel segments 74a, 74b, 74c, 74d. As used herein, "curved" refers to a structure having faces 72a, 72b (FIG. 17) that may include one or more curves or contours which may be regular or irregular, and/or continuous or discontinuous. While a barrel shaped composite structure 72 is illustrated in the drawings, it is to be understood that a variety of other types and shapes of curved composite structures may be fabricated using the disclosed method, and especially those that may be too large in scale to be placed in an autoclave for processing. As will be discussed below, the construction of the panel segments 74a, 74b, 74c, 74d may be similar to the truss panels 20, 20a previously described in connection with FIGS. 1-16. The panel segments 74a, 74b, 74c, 74d may be individually fabricated using techniques similar to those previously described in which each panel segment 74a, 74b, 74c, 74d is laid up on a tool such as the mandrel 76 and is then cured, typically within an autoclave (not shown).

Figure 19:
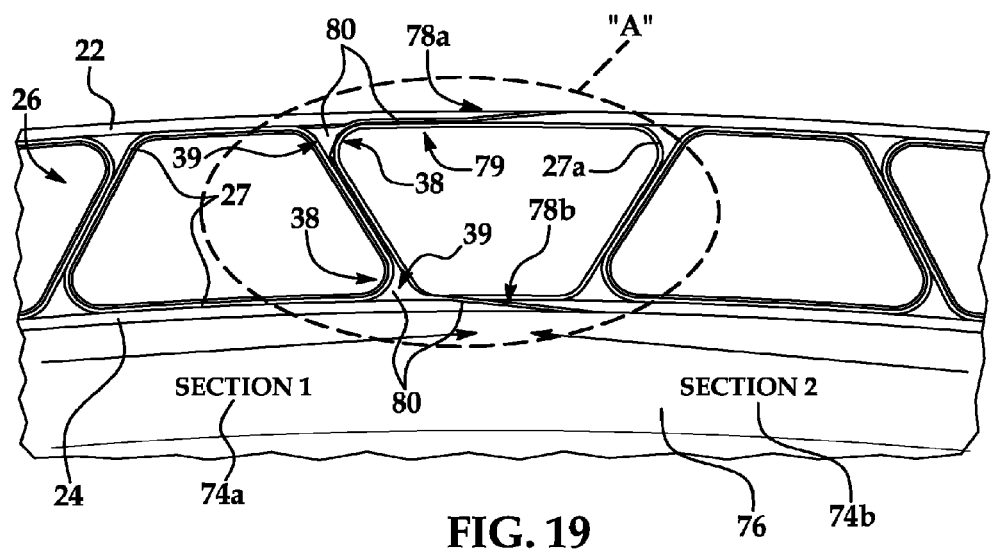
FIG. 19 is a sectional illustration taken along the line 19-19 in FIG. 17.
Figure 20:
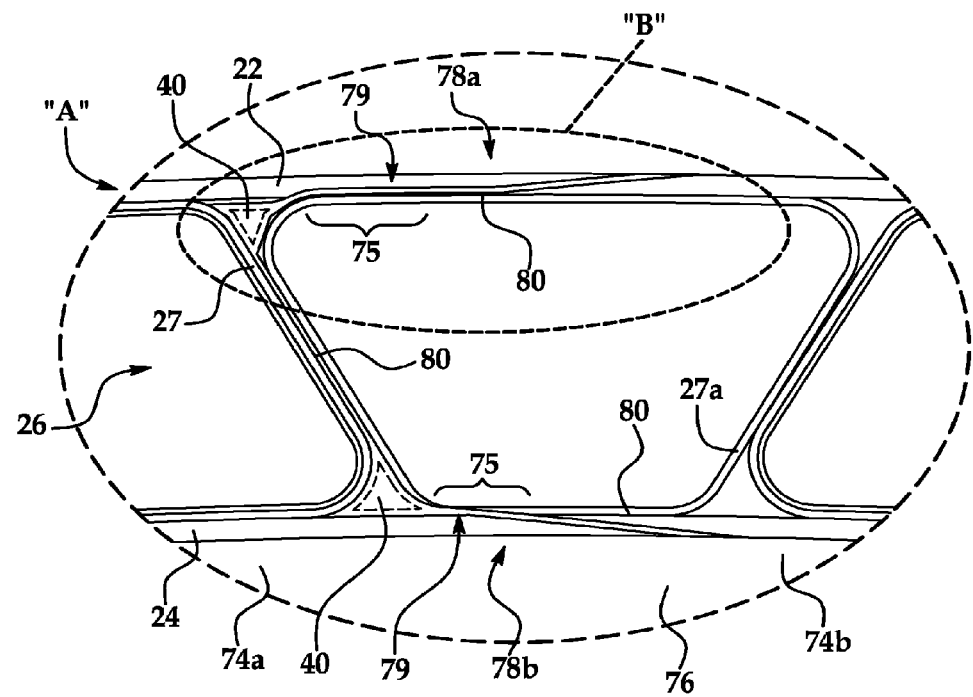
FIG. 20 is an enlarged illustration of the area designated as "A" in FIG. 19.
Figure 21:
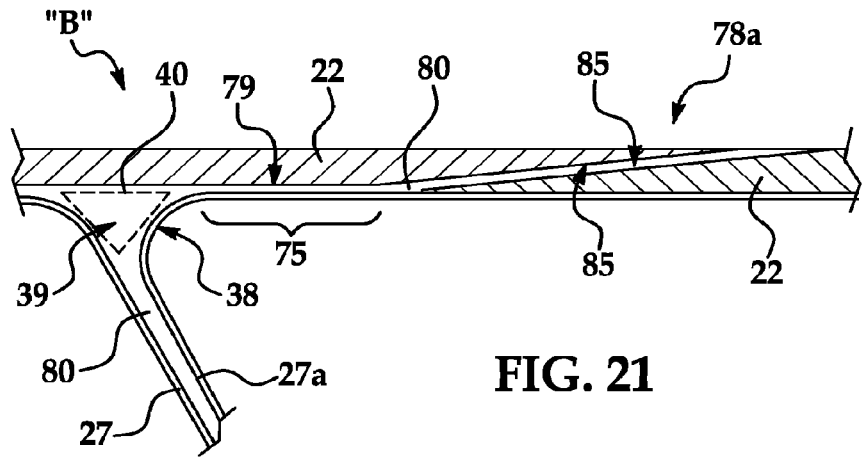
FIG. 21 is an enlarged illustration of the area designated as "B" in FIG. 20.

Referring now to FIGS. 19-21, following curing, the panel segments 74a, 74b, 74c, 74d are joined together to form the composite structure 72 (FIG. 17) using a bonding technique, which may obviate the need for co-curing the panel segments 74a, 74b, 74c, 74d in an autoclave environment. FIGS. 19-21 illustrate two adjoining panel segments 74a, 74b that have been joined together along their mutual edges 77 (FIG. 18) in a bond area generally designated as "A" in FIGS. 19 and 20. Each of the panel segments 74a, 74b comprises a series of fluted cores 27 sandwiched between first and second facesheets 22, 24, similar to the truss panel 20 previously described in connection with FIGS. 1-16. The panel segments 74a, 74b are bonded together by a layer of structural adhesive 80 placed between the panel segments 74a, 74b using a technique that will be described later. The adhesive 80 may be a film adhesive such as, for example and without limitation, FM 1515-3 film adhesive available from Cytec Engineered Materials, which may be cured at temperatures between approximately 250° and 350° F. The use of an adhesive 80 to join the panel segments 74a, 74b which is cured at elevated temperature after the panel segments 74a, 74b are assembled may be referred to as "hot bonding".

As shown in FIGS. 19-21, the facesheets 22, 24 of the adjoining panel segments 74a, 74b include overlapping, scarfed surfaces 85 that form a first overlapping scarf joint 78a between the facesheets 22 on adjacent panel segments 74a, 74b, and a second overlapping scarf joint 78b between the facesheets 24 on the adjacent panel segments 74a, 74b. Although overlapping scarf joints 78a, 76b have been illustrated, other types of joints may be possible including, by way of example and without limitation, single and double lap joints and stepped lap joints, to name only a few.

In addition to the overlapping scarf joints 78a, 78b, lap joints 79 are formed in an area 75 where the facesheets 22, 24 overlap one of the fluted cores 27a which forms part of panel segment 74b. The cores 27, 27a of the adjoining panel segments 74a, 74b are nested together and each include radius corners 38 forming gaps 39 that may be filled with radius fillers 40 of the type previously described in connection with FIGS. 1-16. As best seen in FIGS. 20 and 21, the film adhesive 80 is present between joints 78, 79, fills the gap 39 and extends continuously between the adjacent cores 27, 27a. The bonded joints 78a, 78b, 79 are relatively large in surface area due to their combined length which may provide a strong bond between the panel segments 74a, 74b. Moreover, the joints 78a, 78b, 79 are backed and supported by the fluted core 80 which may function to transfer loads away from the joints 78a, 78b, 79.

Figure 22:
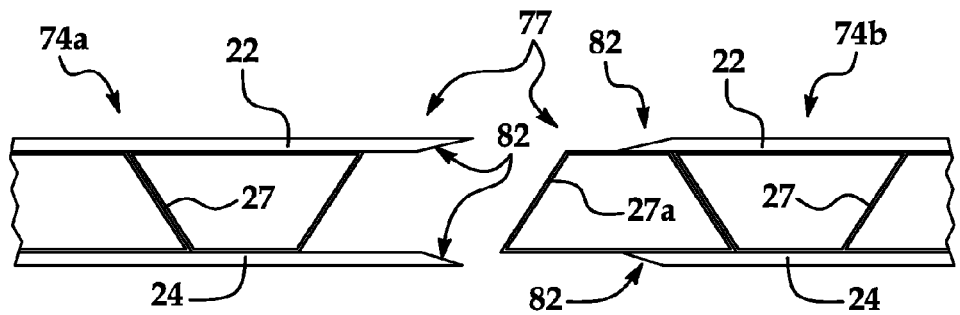
FIG. 22 is a sectional illustration of two adjoining panel segments prior to being joined.

FIG. 22 illustrates the outer edges 77 of the panel segments 74a, 74b having been prepared for a bonding operation. Material is removed from the facesheets 22, 24 of the panel segment 74b to reveal a portion of one of the cores 27a and to form scarfed edges 82. Similarly, the edges 82 of facesheets 22, 24 on the adjoining panel segment 74a are scarfed to compliment the scarfed edges 82 on panel segment 74b. As previously mentioned, material may be removed from the outer edges 77 of the facesheets 22, in a manner to form single or double lap joints, or stepped lap joints, rather than the illustrated scarf joints.

Figure 23:
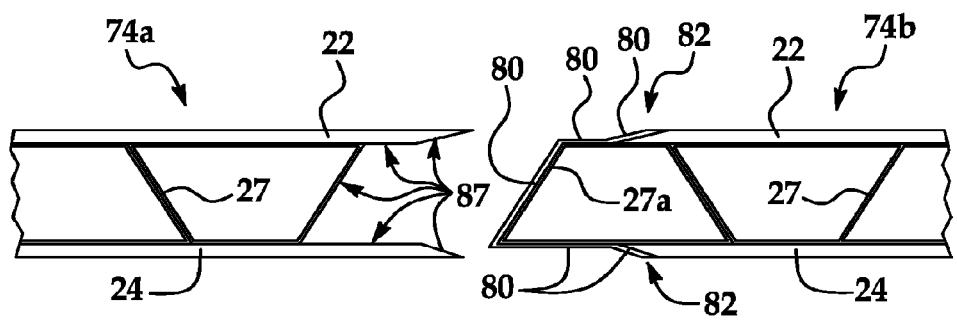
FIG. 23 is an illustration similar to FIG. 22 but showing a layer of adhesive having been applied to one of the panel segments.

Referring now to FIG. 23, the edges 77 of the panel segments 74a, 74b having been prepared as shown in FIG. 22, one or more layers 80 of an adhesive film are applied to panel segment 74b, covering the exposed sides of the fluted core 27a and the scarfed edges 82. Although not shown in the drawings, it may be desirable to apply the film adhesive 80 to surfaces 87 of panel segment 74a (see FIG. 23) that come into contact with panel segment 74b during the assembly process.

Figure 24:
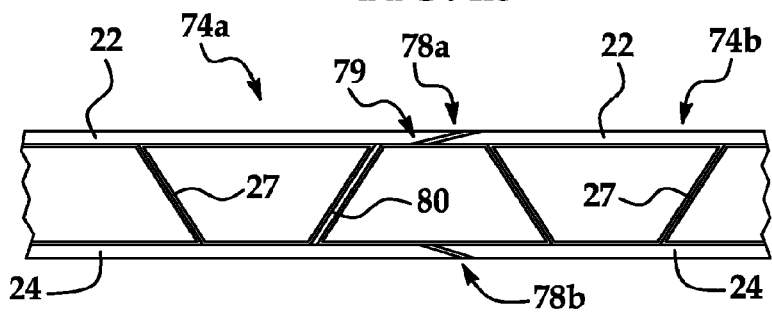
FIG. 24 is an illustration similar to FIG. 23 but showing the panel segments having been joined together.

Next, as shown in FIG. 24, the panel segments 74a, 74b are joined together. This joining process may be carried out on a mandrel 76 (FIG. 18) in order to maintain proper alignment of the panel segments 74a, 74b, 74c, 74d as they are being assembled.

Figure 25:
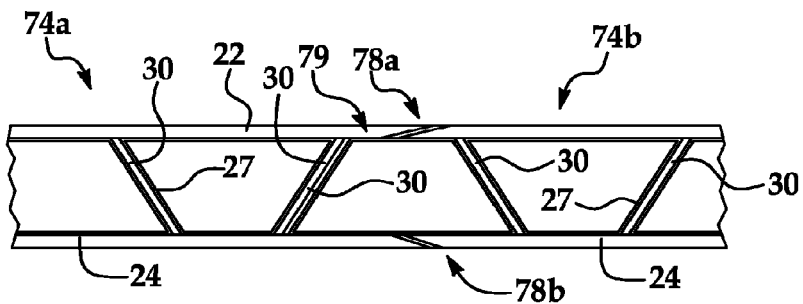
FIG. 25 is an illustration similar to FIG. 24 but showing the use of a foam stiffener in the core of the panel segments.

FIG. 25 illustrates a pair of panel segments 74a, 74b having been joined by bond joints 78, 79, wherein a foam stiffener 27 has been sandwiched between adjacent ones of the fluted cores 27.

Figure 26:
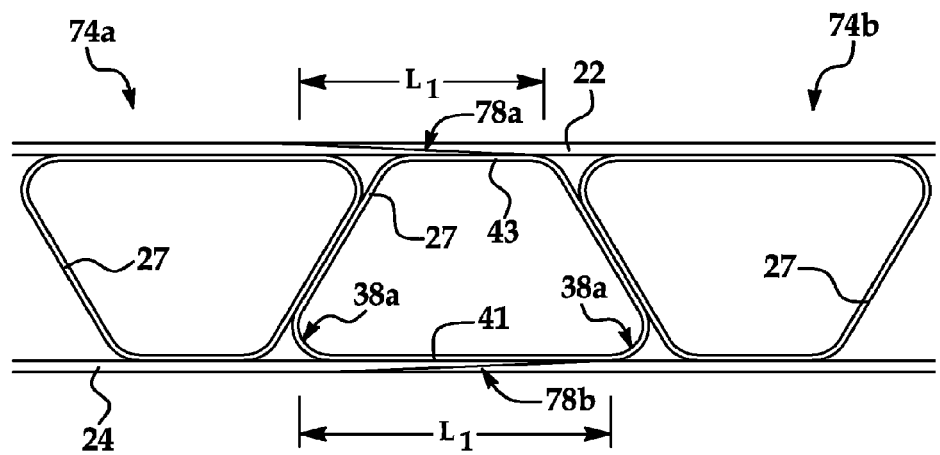
FIG. 26 is a sectional illustration showing one form of a scarf joint between adjoining facesheets.
Figure 27:
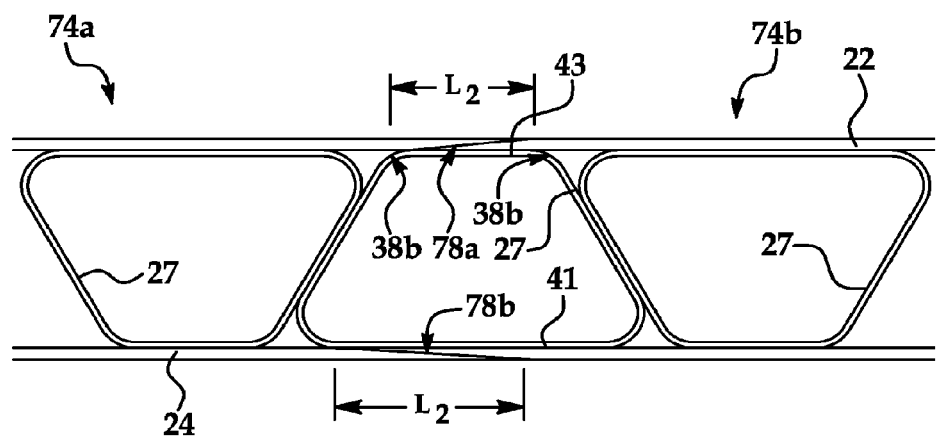
FIG. 27 is an illustration similar to FIG. 25 but showing another form of a scarf joint.

The placement and ramp angle of the scarf joints 78a, 78b shown in FIGS. 19-25 may vary, depending upon the application. For example, FIG. 26 illustrates ramp angles that result in the scarf joints 78a, 78b having lengths $L_1$ that are generally equal to the distance between the radius corners 38a on the bottom wall 41 of the core 27, which is longer in length than the top wall 43. FIG. 27 illustrates ramp angles that result in the scarf joints 78a, 78b having lengths $L_2$ that are generally equal to the distance between the radius corners 38b on the top wall 43 of the core 27, which is shorter in length than the bottom wall 43. In other embodiments, ramp angles between approximately 20 to 1 and 30 to 1 may be desirable.

Figure 28:
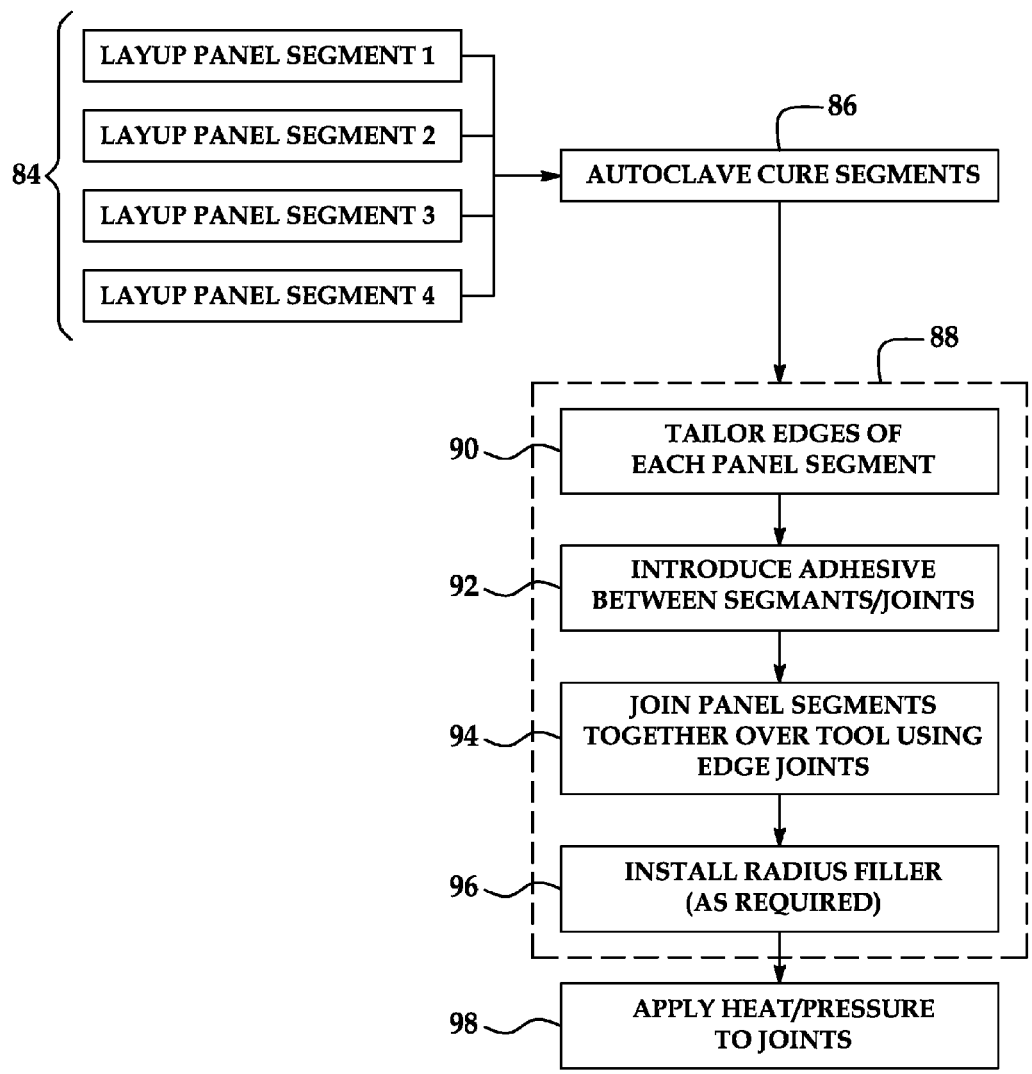
FIG. 28 is an illustration of a flow diagram of a method for forming a composite structure using sandwich panel segments joined together by bonded joints.

Attention is now directed to FIG. 28 which illustrates the overall steps of a method of forming a curved composite structure using bonded joints. Beginning at 84, each of the panel segments 74a, 74b, 74c, 74d is individually laid up, typically on a curved tool which may comprise, for example, the cylindrical mandrel 76 shown in FIG. 18. Following layup, the panel segments 74a, 74b, 74c, 74d may be cured at 86 using an autoclave (not shown) to apply heat and pressure to the panel segments 74.

The formed and cured panel segments 74 are then joined to each other to form the composite structure 72 through a series of steps 88. Beginning at 90, the edges 77 of each of the panel segments 74 is tailored so that the edges 77 resemble those shown in FIG. 22 wherein the edges 82 of the facesheets 22, 24 have been scarfed and a length of the facesheets 22, 24 on one of the panel segments (74*b*) has been removed to reveal a portion of one of the fluted cores 27*a*. Depending upon the application, it may be possible to perform tailoring of the edges 77 as part of the layup process 84. For example, during the layup sequence 84, the facesheets 22, 24 may be laid up using ply drop-offs (not shown) to form the scarfed edges 85 shown in FIG. 21.

At step 92, the adhesive 80 may be applied to the bonding surfaces of one of the panel segments 74, as previously discussed in connection with FIG. 23. Next, at 94, the panel segments 74*a*, 74*b*, 74*c*, 74*d* may be assembled and joined together while supported by a tool such as the mandrel 76 (FIG. 18). Joining of the panel segments 74*a*, 74*b*, 74*c*, 74*d* includes bringing the edges 77 of the adjoining panel segments 74 together to form the joints 78, 79. Either before or during the process of joining the panel segments 74*a*, 74*b*, 74*c*, 74*d*, the previously mentioned fillers 40 (FIG. 21) may be installed, as required.

With the panel segments 74*a*, 74*b*, 74*c*, 74*d* having been joined together, the adhesive 80 may then be cured as shown at step 98 by applying heat to the adhesive 80, either by placing the composite structure 72 in an oven (not shown) or by applying heating strips (not shown) locally over the bonded joints 78*a*, 78*b*, 79. It may also be necessary and/or desirable to apply pressure to the bonded joints 78, 79 during the process of curing the adhesive, either through vacuum bagging and/or expanding the mandrel 76.

It may be also possible to assemble the panel segments 74 by tooling (not shown) which supports the outer mold line of the panel segments 74.

Figure 29:
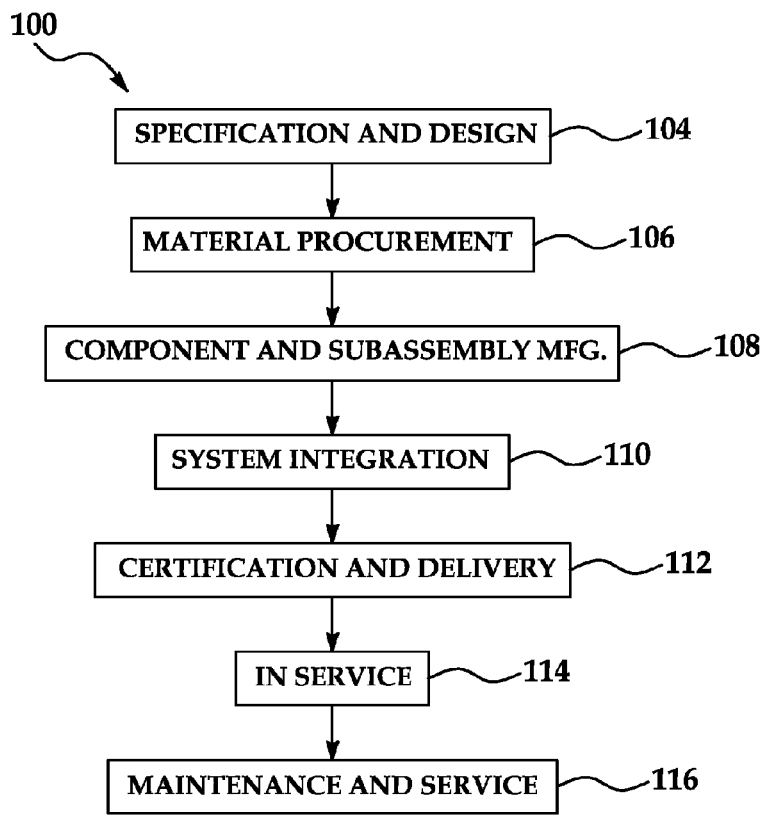
FIG. 29 is a flow diagram illustration of aircraft production and service methodology.
Figure 30:
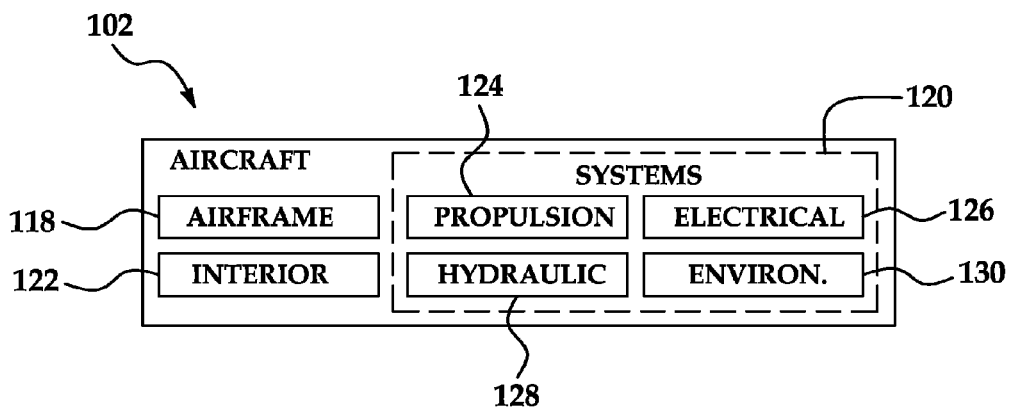
FIG. 30 is a block diagram illustration of an aircraft.

Embodiments of the disclosure may find use in a variety of potential applications, particularly in the transportation industry, including for example, aerospace, marine and automotive applications. Thus, referring now to FIGS. 29 and 30, embodiments of the disclosure may be used in the context of an aircraft manufacturing and service method 100 as shown in FIG. 29 and an aircraft 102 as shown in FIG. 30. During pre-production, exemplary method 100 may include specification and design 104 of the aircraft 102 and material procurement 106. During production, component and subassembly manufacturing 108 and system integration 110 of the aircraft 102 takes place. The disclosed method may be employed to fabricate curved composite components as part of the component and subassembly manufacturing 108, and the curved composite components may be assembled as part of the system integration 110 process. Thereafter, the aircraft 102 may go through certification and delivery 112 in order to be placed in service 114. While in service by a customer, the aircraft 102 is scheduled for routine maintenance and service 116 (which may also include modification, reconfiguration, refurbishment, and so on).

Each of the processes of method 100 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 30, the aircraft 102 produced by exemplary method 100 may include an airframe 118 with a plurality of systems 120 and an interior 122. Examples of high-level systems 126 include one or more of a propulsion system 124, an electrical system 128, a hydraulic system 128, and an environmental system 130. Any number of other systems may be included. Although an aerospace example is shown, the principles of the disclosure may be applied to other industries, such as the marine and automotive industries.

Systems and methods embodied herein may be employed during any one or more of the stages of the production and service method 100. For example, components or subassemblies corresponding to production process 80 may be fabricated or manufactured in a manner similar to components or subassemblies produced while the aircraft 102 is in service. Also, one or more apparatus embodiments, method embodiments, or a combination thereof may be utilized during the production stages 108 and 110, for example, by substantially expediting assembly of or reducing the cost of an aircraft 100. Similarly, one or more of apparatus embodiments, method embodiments, or a combination thereof may be utilized while the aircraft 102 is in service, for example and without limitation, to maintenance and service 116.

Although the embodiments of this disclosure have been described with respect to certain exemplary embodiments, it is to be understood that the specific embodiments are for purposes of illustration and not limitation, as other variations will occur to those of skill in the art.

What is claimed is:

1. A curved composite structure, comprising:
a first curved composite panel, wherein the first curved composite panel comprises a first fluted core having a first plurality of flutes covered by a first face sheet and a second face sheet opposite the first face sheet, wherein a first edge of a first flute of the first plurality of flutes extends outwardly from the first face sheet and the second face sheet, and wherein the first edge is relative to a first axis of the first flute;
a second curved composite panel, wherein the second curved composite panel comprises a second fluted core having a second plurality of flutes covered by a third face sheet and a fourth face sheet opposite the third face sheet, wherein the third face sheet and the fourth face sheet extend outwardly past a second edge of a second flute of the second plurality of flutes, wherein the second edge is relative to a second axis of the second flute, and wherein a space is defined between the third face sheet and the fourth face sheet where the third face sheet and the fourth face sheet extend outwardly past the second edge;
an overlapping joint between the first curved composite panel and the second curved composite panel, the overlapping joint being defined by the first flute being disposed in the space; and
an adhesive bonding the first curved composite panel and the second curved composite panel together.

2. The curved composite structure of claim 1, wherein the overlapping joint comprises a first overlapping joint, and further comprising:
a second overlapping joint between the first curved composite panel and the second curved composite panel, wherein the adhesive extends between the first and second overlapping joints.

3. The curved composite structure of claim 1, wherein:
the first fluted core and the second fluted core are disposed side-by-side, and
the adhesive extends between the first fluted core and the second fluted core.

4. The curved composite structure of claim 2, wherein each of the first overlapping joint and the second overlapping joint is a scarf joint.

5. The curved composite structure of claim 1, wherein:
a portion of the second face sheet overlies and is bonded to the first fluted core; and
a portion of the third face sheet overlies and is bonded to the second fluted core.

6. The curved composite structure of claim 2, wherein:
the first overlapping joint and the second overlapping joint are supported on one of the first fluted core or the second fluted core.

7. The curved composite structure of claim 1, further comprising a first stiffener of structural foam disposed between the first face sheet and the second face sheet, and a second stiffener of structural foam disposed between the third face sheet and the fourth face sheet.

8. A barrel-shaped composite structure for aerospace vehicles, comprising;
wherein edges of the respective first and second face sheets overlap each other to form overlapping joints between the adjoining panel segments, wherein the respective first and second face sheets of each of the plurality of curved composite panel segments,
wherein edges of the respective first and second face sheets overlap each other to form overlapping joints between adjoining panel segments,
wherein face sheets of each of the plurality of curved composite panel segments overlap a given fluted core of an adjoining panel, and wherein for any given pair of curved composite panel segments, a given edge of a given fluted core is inserted into a space created by the respective first and second face sheets that extend beyond another edge of another fluted core of an adjacent curved composite panel segment; and
a layer of adhesive bonding adjoining panel segments together, the layer of adhesive extending between the overlapping joints between the respective first and second face sheets, and between the respective first and second face sheets and the given fluted core.

9. The barrel-shaped composite structure of claim 8, wherein the overlapping joints comprise scarf joints.

10. The barrel-shaped composite structure of claim 8 further comprising:
a structural foam disposed between the respective first and second face sheets of corresponding curved composite panel segments.

11. The curved composite structure of claim 1, wherein the fluted core further comprises a series of flutes.

12. The curved composite structure of claim 11, wherein the series of flutes are trapezoidal in shape.

13. The curved composite structure of claim 12, wherein the series of flutes are isosceles trapezoidal in shape.

14. The curved composite structure of claim 13, wherein walls of the series of flutes form a truss-like structure.

15. The curved composite structure of claim 7, wherein the structural foam is one of polymethacrylimide (PMI) and polyisocyanurate.

16. The barrel-shaped composite structure of claim 8, wherein the fluted core further comprises a series of flutes.

17. The barrel-shaped composite structure of claim 16, wherein the series of flutes are trapezoidal in shape.

18. The barrel-shaped composite structure of claim 17, wherein the series of flutes are isosceles trapezoidal in shape.

19. The barrel-shaped composite structure of claim 18, wherein walls of the series of flutes form a truss-like structure.

20. The barrel-shaped composite structure of claim 8, wherein the at least one structural foam stiffener is one of polymethacrylimide (PMI) and polyisocyanurate.

\* \* \* \* \*